United States Patent
McPherson et al.

(10) Patent No.: US 9,762,095 B2
(45) Date of Patent: Sep. 12, 2017

(54) STATOR USED IN AN ELECTRICAL MOTOR OR GENERATOR WITH LOW LOSS MAGNETIC MATERIAL AND METHOD OF MANUFACTURING A STATOR

(75) Inventors: Mark W. McPherson, Otsego, MI (US); Andrew D. Hirzel, Kalamazoo, MI (US)

(73) Assignee: RADAM Motors, LLC, Otsego, MI (US)

( * ) Notice: Subject to any disclaimer, the term of this patent is extended or adjusted under 35 U.S.C. 154(b) by 670 days.

(21) Appl. No.: 13/993,167

(22) PCT Filed: Dec. 13, 2011

(86) PCT No.: PCT/US2011/064535
§ 371 (c)(1),
(2), (4) Date: Jun. 11, 2013

(87) PCT Pub. No.: WO2012/082680
PCT Pub. Date: Jun. 21, 2012

(65) Prior Publication Data
US 2013/0278103 A1   Oct. 24, 2013

Related U.S. Application Data

(60) Provisional application No. 61/422,458, filed on Dec. 13, 2010, provisional application No. 61/469,894, filed on Mar. 31, 2011.

(51) Int. Cl.
*H02K 1/14* (2006.01)
*H02K 15/02* (2006.01)
*H02K 1/17* (2006.01)

(52) U.S. Cl.
CPC ............... *H02K 1/17* (2013.01); *H02K 1/148* (2013.01); *H02K 15/02* (2013.01); *Y10T 29/49009* (2015.01)

(58) Field of Classification Search
CPC ...... H02K 1/148; H02K 2203/12; H02K 1/17; H02K 15/02; H02K 1/02; Y10T 29/49009
(Continued)

(56) References Cited

U.S. PATENT DOCUMENTS 2,236,291 A * 3/1941 Kilbourne .............. H02K 1/148
310/216.061
3,983,435 A * 9/1976 Sims ........................ H02K 1/12
310/216.003
(Continued)

FOREIGN PATENT DOCUMENTS

CN       1539188 A      10/2004
CN     101483359 A       7/2009
(Continued)

OTHER PUBLICATIONS

International Preliminary Report on Patentability from corresponding Patent Cooperation Treaty Patent Application No. PCT/US2011/064535 mailed Jun. 27, 2013.
(Continued)

*Primary Examiner* — John K Kim
*Assistant Examiner* — Noli Manaloto
(74) *Attorney, Agent, or Firm* — Gardner, Linn, Burkhart & Flory, LLP

(57) ABSTRACT

A stator for an electrical motor or generator and method for manufacturing such stator includes providing a plurality of teeth and joining the teeth with a yoke. An electrically conductive winding is applied around each of the teeth. The teeth and/or yoke may be made from a stack of low-loss magnetic material sheets. The teeth and/or yoke may be made by folding a stack of magnetic material sheets.

19 Claims, 21 Drawing Sheets

(58) Field of Classification Search
USPC ............ 310/215, 194, 216, 154.02, 216.007,
310/216.008, 216.009, 216.015, 216.016,
310/216.042, 216.045, 216.004
See application file for complete search history.

(56) References Cited

U.S. PATENT DOCUMENTS

| | | | |
|---|---|---|---|
| 4,392,072 A * | 7/1983 | Rosenberry | H02K 1/16 310/216.061 |
| 6,177,751 B1 * | 1/2001 | Suzuki | H02K 1/148 310/194 |
| 6,960,860 B1 * | 11/2005 | DeCristofaro | H02K 1/148 310/216.113 |
| 7,018,498 B2 | 3/2006 | Berwald et al. | |
| 7,067,950 B2 | 6/2006 | Hirzel et al. | |
| 7,245,055 B2 * | 7/2007 | Jack | H02K 1/148 310/216.013 |
| 7,468,569 B2 | 12/2008 | Hirzel | |
| 7,498,709 B2 * | 3/2009 | Shteynberg | H02K 15/022 242/445 |
| 8,779,644 B2 * | 7/2014 | Tanaka | H02K 3/28 310/179 |
| 2002/0163275 A1 | 11/2002 | Hsu | |
| 2004/0010908 A1 * | 1/2004 | Kobayashi | H02K 3/325 29/596 |
| 2004/0245879 A1 | 12/2004 | Hirzel et al. | |
| 2005/0218749 A1 * | 10/2005 | Shin | H02K 1/148 310/216.008 |
| 2006/0006749 A1 * | 1/2006 | Sasaki | B62D 5/0406 310/68 R |
| 2006/0022544 A1 * | 2/2006 | Kinashi | H02K 21/16 310/179 |
| 2006/0055274 A1 * | 3/2006 | Kim | H02K 15/02 310/216.016 |
| 2006/0103263 A1 * | 5/2006 | Naito | H02K 1/148 310/268 |
| 2007/0170810 A1 | 7/2007 | Hirzel | |
| 2008/0246362 A1 * | 10/2008 | Hirzel | H02K 21/12 310/156.02 |
| 2009/0058212 A1 | 3/2009 | Czajkowski et al. | |
| 2009/0195112 A1 * | 8/2009 | Chai | H02K 1/148 310/216.086 |
| 2012/0286619 A1 * | 11/2012 | Tsuiki | H02K 3/522 310/215 |

FOREIGN PATENT DOCUMENTS

| | | |
|---|---|---|
| JP | 57107015 | 7/1982 |
| JP | 7-231587 A | 8/1995 |
| JP | 2005168187 | 6/2005 |
| JP | 2006196855 | 7/2006 |
| JP | 2007135324 | 5/2007 |
| JP | 2008253127 | 10/2008 |
| WO | 99/48187 A1 | 9/1999 |

OTHER PUBLICATIONS

International Search Report and Written Opinion of the International Searching Authority from corresponding Patent Cooperation Treaty (PCT) Application No. PCT/US11/64535, mailed Jul. 30, 2012.

* cited by examiner

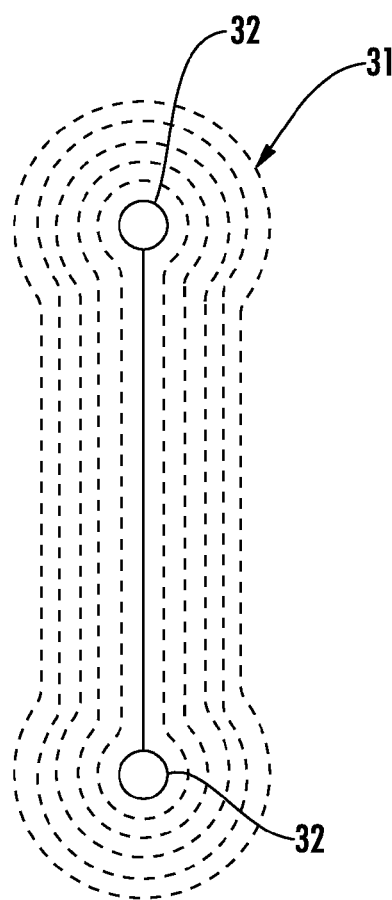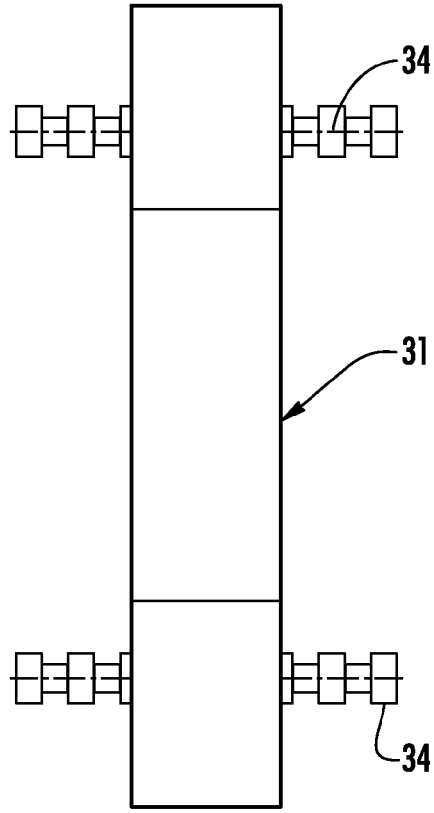
FIG. 4  FIG. 5
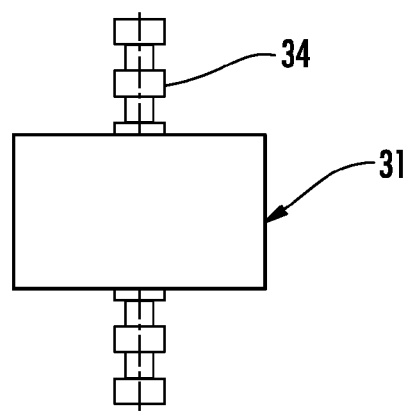
FIG. 6

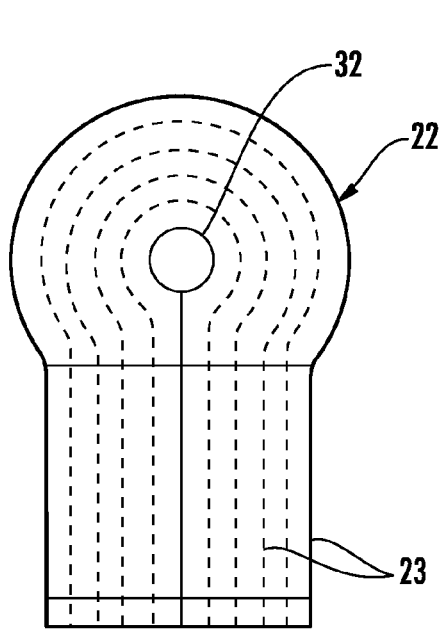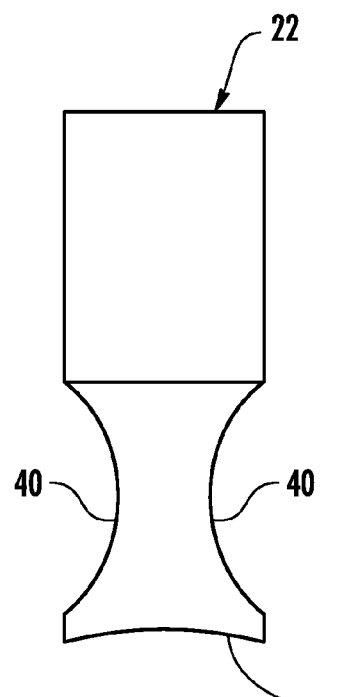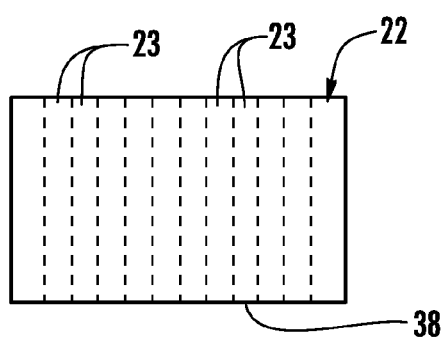
FIG. 10    FIG. 11
FIG. 12

STATOR USED IN AN ELECTRICAL MOTOR OR GENERATOR WITH LOW LOSS MAGNETIC MATERIAL AND METHOD OF MANUFACTURING A STATOR

CROSS REFERENCE TO RELATED APPLICATIONS

This application claims the priority benefits of International Patent Application No. PCT/US2011/064535, filed on Dec. 13, 2011, which claims priority from U.S. provisional patent application Ser. No. 61/422,458, filed on Dec. 13, 2010, and U.S. provisional patent application Ser. No. 61/469,894, filed on Mar. 31, 2011, the disclosures of which are hereby incorporated herein by reference in their entirety.

BACKGROUND OF THE INVENTION

The present invention is directed to a stator used in an electrical motor or generator, an electrical motor or generator using such stator by combining a rotor with the stator, and method of manufacturing such stator. The invention is particularly useful for radial air gap motors or generators, but may have applications to other configurations, such as axial air gap motors or generators, or the like. The stator may surround the rotor or may be surrounded by the rotor. The resulting electrical motor or electrical generator may use a stator, according to an embodiment of the invention, in combination with a permanent magnet rotor, an induction rotor, a switched reluctance rotor, a DC brushed rotor, or the like, to form any type of rotating electrical device. While illustrated for use as a stator, certain aspects of the invention may be useful in making a rotor for an electrical motor or electrical generator.

Electrical motors and generators include a stator and rotor. The stator may be the armature and the rotor may be the electromagnetic field, or vice versa. One common form of motor is a radial air gap motor having an outer stator and a rotor inside of the stator, or vice versa. The stator is typically constructed of iron-based laminations that form the yoke and teeth as one piece. The tooth may be wider at the stator-rotor air gap than the main tooth body in order to better accumulate and focus the electromagnetic flux. The result may be very close spacing between adjacent teeth at the air gap.

Electrical conductors, such as insulated copper wires, are installed in slots between and encircling the teeth. In one common form of the stator, the conductors are installed by inserting the conductors through the spacing between the teeth. Because of the narrow opening between the teeth at the air gap, it is difficult to achieve precision in the final placement of the windings in the slots resulting in non-uniform winding layers. This leaves available winding space that is not occupied by the winding, which results in a finished device that achieves less than potential performance.

SUMMARY OF THE INVENTION

Low-loss magnetic material, such as amorphous iron, nano-crystalline metal and optimized Si—Fe alloy has desirable properties for use in a stator of an electrical motor or generator. This includes good flux-carrying capabilities and superior core loss properties. Such low-loss magnetic material typically is supplied in an extremely thin ribbon that is very brittle, making commercial processing, such as stamping, shearing, blanking, machining and cutting difficult. These properties have restricted the use of low-loss magnetic material in motors and generators. The present invention provides a stator for an electrical motor or generator, an electrical motor or generator using such stator and a method of manufacturing such stator that overcome such restriction.

A stator for an electrical motor or generator and method for manufacturing such stator, according to an aspect of the invention, includes providing a plurality of teeth and joining the teeth with a yoke. An electrically conductive winding is applied around each of the teeth. Each of the teeth and/or the yoke is made from a stack of low-loss magnetic material sheets.

Each of the teeth and/or yoke may be made from one or more folded stacks of low-loss magnetic sheets. Each folded stack of low-loss magnetic material may be made from a flattened toroid of low-loss magnetic ribbon. Each of the teeth may be made from a plurality of folded stacks of low-loss magnetic material sheets. The yoke may be made of a plurality of yoke pieces, each made from at least one stack of low-loss magnetic material sheets. Each of the yoke pieces may span adjacent ones of the teeth. The magnetic material sheets of the yoke may be non-coplanar with the magnetic material sheets of the teeth. The teeth and the yoke pieces may be retained together by complementary shapes formed in the teeth and the yoke pieces. The teeth may have distal ends, opposite their pole faces, that are no larger than the portion of the tooth that supports the electrical windings to allow the windings to be formed separate from the teeth and applied over the distal ends of the teeth.

The low-loss magnetic material may be amorphous metal, such as magnetic iron, nanocrystalline metal and/or an optimized Si—Fe alloy. The metal sheets may have a thickness that is less than or equal to approximately 100 micrometers and may be in a range of approximately 20 to approximately 50 micrometers.

The magnetic material sheets may be non-insulated from each other and may be held together without substantial adhesive. Alternatively, the magnetic material sheets may be held together at least in part with an adhesive. The yoke may define a motor/generator axis about which a rotor rotates and the magnetic material sheets may be oriented perpendicular to the motor/generator axis.

The folded stack may define a bight, such as a 180-degree bight, in the magnetic material sheets. A retention device may be provided at the bight and serve to assist in retaining the tooth to the yoke. Alternatively or additionally, a retention shape may be formed at the bight. The stack of low-loss magnetic sheets may be machined, such as by using a rotary tool. A pole face may be formed in each of the teeth. A bight may be formed in the folded sheets with the pole face being opposite the bight.

The yoke may be made from a soft magnetic material that is different from the material making up the magnetic sheets. The yoke may be an injection-molded yoke. The yoke may be molded to the teeth, such as after the winding is formed around each of the teeth. The teeth may be retained by complementary shapes formed in the teeth and said yoke. The yoke may be made of a plurality of yoke pieces. Each of the yoke pieces may span adjacent ones of the teeth. Each of the teeth may be made from a plurality of such folded stacks.

The stator may include a bobbin around each of the teeth and a wire coil wound around the bobbin. The bobbin may define an internal space for receiving one of the teeth and for joining that tooth to adjacent yoke pieces. Each bobbin may include complementary shapes for joining to adjacent ones of the bobbin. The bobbin may be defined by bobbin halves and insulating paper joining the bobbin halves. The bobbin halves may be identical in shape.

The yoke may be combined with a rotor thereby defining an electrical motor or electrical generator.

A stator for an electrical motor or generator and method for manufacturing such stator, according to another aspect of the invention, includes providing a plurality of teeth and joining the teeth with a yoke. An electrically conductive winding is applied around each of the teeth. Each of the teeth is made by folding one or more stacks of magnetic sheets.

These and other objects, advantages, and features of this invention will become apparent upon review of the following specification in conjunction with the drawings.

BRIEF DESCRIPTION OF THE DRAWINGS

FIG. 4 is a top plan view of a flattened toroid with an exaggerated bight;

FIG. 5 is a side elevation view of the flattened toroid in FIG. 4 with a retention device shown at the bight;

FIG. 6 is an end elevation view of the flattened toroid in FIG. 4 with a retention device shown at the bight;

FIG. 10 is the same view as FIG. 7 illustrating a machined tooth with the retention member not shown;

FIG. 11 is a side elevation view of the machined tooth in FIG. 10 with contoured relief to accommodate windings;

FIG. 12 is an end elevation view of the machined tooth in FIG. 10;

DESCRIPTION OF THE PREFERRED EMBODIMENT

Figure 1:
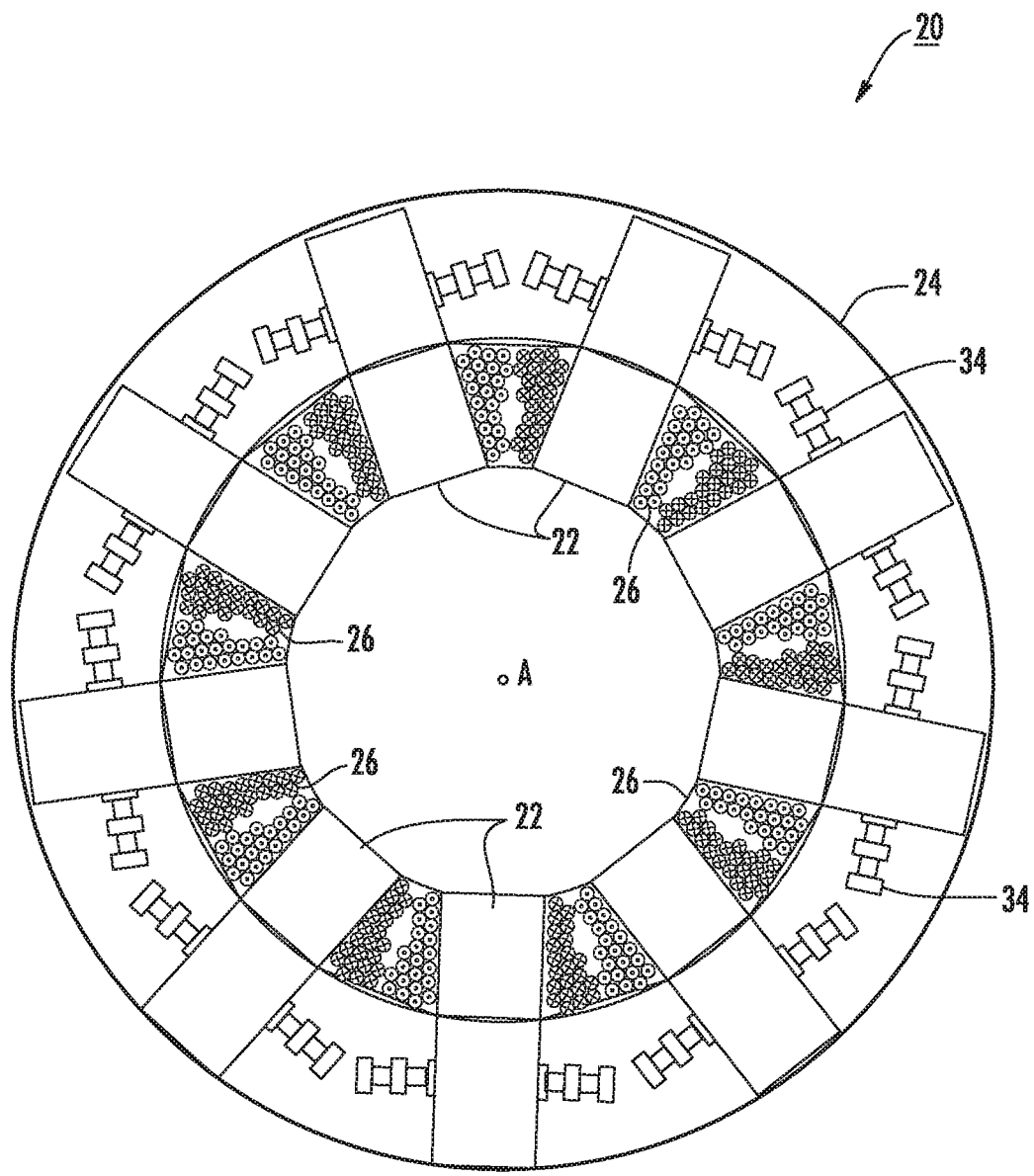
FIG. 1 is an end view of a stator, according to an embodiment of the invention, as viewed in the direction of the axis of rotation of a rotor of the motor or generator.
Figure 2:
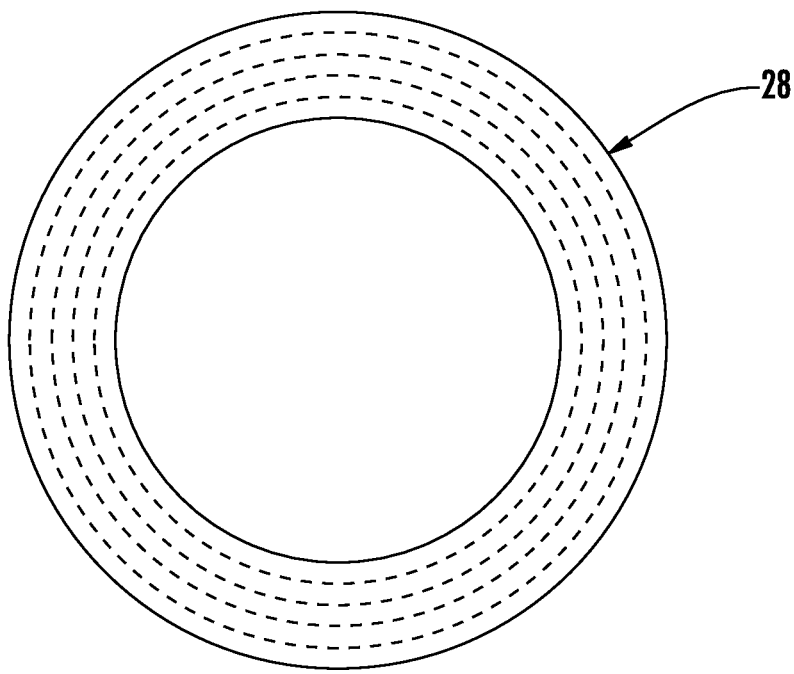
FIG. 2 is a top plan view of a toroid of amorphous metal ribbon.
Figure 3:
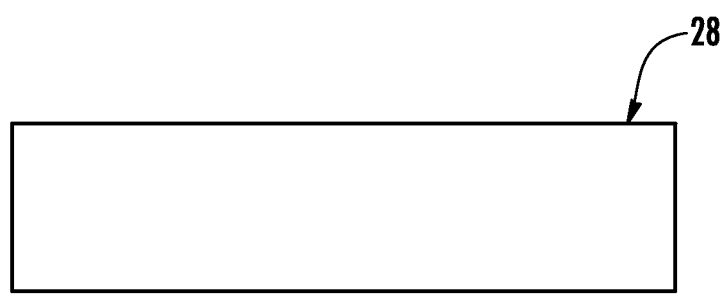
FIG. 3 is a an end view of the toroid in FIG. 2.

Referring now to the drawings and the illustrative embodiments depicted therein, a stator 20 for either an electrical motor or an electrical generator includes a plurality of teeth 22, a yoke 24 joining teeth 22 and an electrically conductive winding 26 around each tooth 22 (FIGS. 1-12). Yoke 24 physically mounts teeth 22 and provides a path of magnetic flux between the teeth. Stator 20 defines a motor/generator axis A about which a rotor (not shown) rotates thereby defining a radial air gap motor or generator.

Windings 26 may be electrically interconnected in a manner that when combined with a rotor having a particular number of magnetic poles defines a motor or generator having a fractional number of slots per phase per pole (SPP). Yoke 24 carries magnetic flux between teeth 22. The teeth pass the flux produced by windings 26 as well as flux generated by the rotor. In fractional SPP configurations, each tooth carries flux that is not in phase (either directionally or in magnitude) with its neighbor. Therefore, the yoke is required to carry less flux than in an integral SPP configuration. Therefore, the yoke set forth in the illustrated embodiments can be made relatively small in size in fractional SPP configurations to compensate for a potential increase in material costs over iron laminations that make up conventional motor yokes. Such conventional yokes may potentially cost less, but have disadvantages to overall motor performance. Also, the use of relatively high surface area connections between the teeth and yoke material reduces magnetic flux gap reluctances.

Also, fractional SPP configurations are better suited for higher frequency of synchronous drive current for motors or generators with higher pole count. Synchronous frequency is the primary motor torque-producing frequency, whether the rotor is permanent magnet, brush or brushless DC, or induction. This is because a greater number of slots are typically used for high pole devices thus making use of the ability to manufacture the stator utilizing the techniques disclosed herein. Higher synchronous frequency motor/generator designs lead to higher power densities and, with techniques shown herein, also allow the losses to be managed. However, it should be understood that the illustrated embodiments can also be used with designs having relatively fewer slots.

Teeth 22 are made from a stack of low-loss magnetic material sheets 23. Such material in such configuration produces lower core losses than conventional laminations. This makes stator 20 particularly suitable for higher frequency motor and generator applications. In the illustrated embodiment, low-loss magnetic material sheets 23 may be made from a metal with approximately 6.5% silicon content, such as nano-crystalline metal or amorphous iron that is available from various sources, such as the Hitachi Metals produced Metglas magnetic alloy 2605SA1, the Advanced Technology & Materials Co., Ltd. produced Antaimo, or the Hitachi Metals produced Finemet. Alternatively, sheets 23 may be made from the JFE produced Super Core Si—Fe alloy. In the illustrated embodiment, metal sheets 23 have a thickness that is less than or equal to approximately 100 micrometers and may be in a range of approximately 20 to approximately 50 micrometers.

Yoke 24 is made from a material that is different from that making up teeth 22. Yoke 24 may be made of a polymer-bonded soft magnetic material, also known as a powdered metal-filled plastic material. The material may be a blend of magnetic iron powder with a polymer. Yoke 24 may be formed in a mold and simultaneously over-molded onto teeth 22 by injection molding, such as in the manner disclosed in commonly assigned U.S. patent application Ser. No. 61/379,793, filed Sep. 3, 2010, by McPherson et al. entitled "Stator Used in an Electrical Motor or Generator and Method of Manufacturing a Stator," the disclosure of which is hereby incorporated herein by reference in its entirety.

Figure 7:
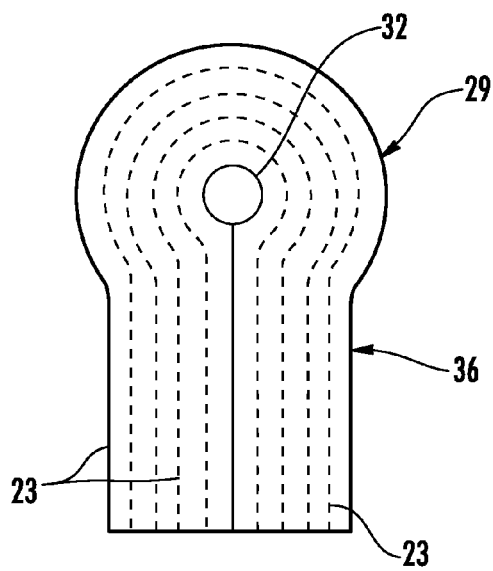
FIG. 7 is the same view as FIG. 4 showing a severed portion of the flattened toroid.
Figure 8:
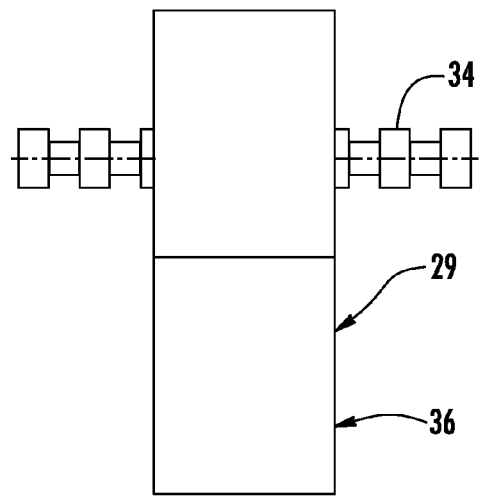
FIG. 8 is a side elevation view of the severed portion in FIG. 7.
Figure 9:
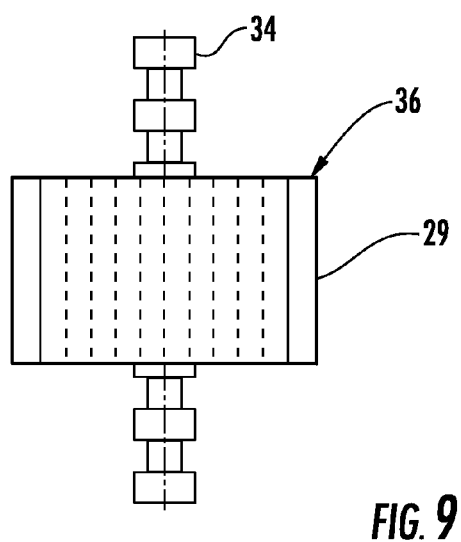
FIG. 9 is an end elevation view of the severed portion in FIG. 7.

Teeth 22 may be made up of at least one folded stack 29 of low-loss magnetic sheets 23. Each folded stack 29 may be made from toroid 28 of low-loss magnetic material ribbon (FIGS. 2 and 3) that is flattened, using a press, or the like, to a flattened toroid 31 (FIGS. 4-6). Flattened toroid 31 may be severed into two severed portions 36, as best seen in FIGS. 7-9 with the severed pieces annealed using known techniques. However, it is possible to make only one or more than two teeth from one flattened toroid of magnetic material ribbon. The magnetic sheets may be non-insulated from each other. In this fashion, any insulation between the sheets, helpful in reducing eddy current losses, is provided by trapped air. The absence of separate insulation layers assists in increasing the stacking factor of the sheets, which would, otherwise, be significantly reduced by the large number of relatively thin sheets. In the illustrated embodiment, a stacking factor of between 80% and 90% may be achieved. Also, the folding of sheets 23 produces sufficient mechanical bonding that the sheets may be held together without substantial adhesive. However the sheets may be held together at least in part with an adhesive if desired. In the illustrated embodiment, metal sheets 23 are oriented perpendicular to motor/generator axis A.

Each folded stack 29 is compressed sufficiently to experience persistent deformation of the metal sheets thereby defining a bight 32 in metal sheets 23. An optional retention device, such as a retention pin or bar 34, may be positioned at bight 32. Retention device 34, which may be made from various materials and of various shapes, is held in place by the force of the deformed sheets and serves to anchor teeth 22 in yoke 24. Each folded stack 29 may undergo post-folding machining in order to enhance the shape of teeth 22. As seen in FIGS. 10-12, an arcuate air gap pole face 38 may be machined into the end of folded stack 29, such as opposite bight 32. Also, a winding notch 40 may be formed in the sides of each folded stack to accommodate winding 26. Air gap pole face 38 and winding notches 40 may be formed by machining folded stack 29 of amorphous metal sheets to the desired shape of a tooth 22. The stack may be machined using a rotary tool that rotates, such as about a cutting axis that is perpendicular to the plane of metal sheets 23. However, the rotary tool may rotate about another cutting axis and other forms of machining, such as electrical discharge machining, or a laser or water jet may be used.

Figure 13:
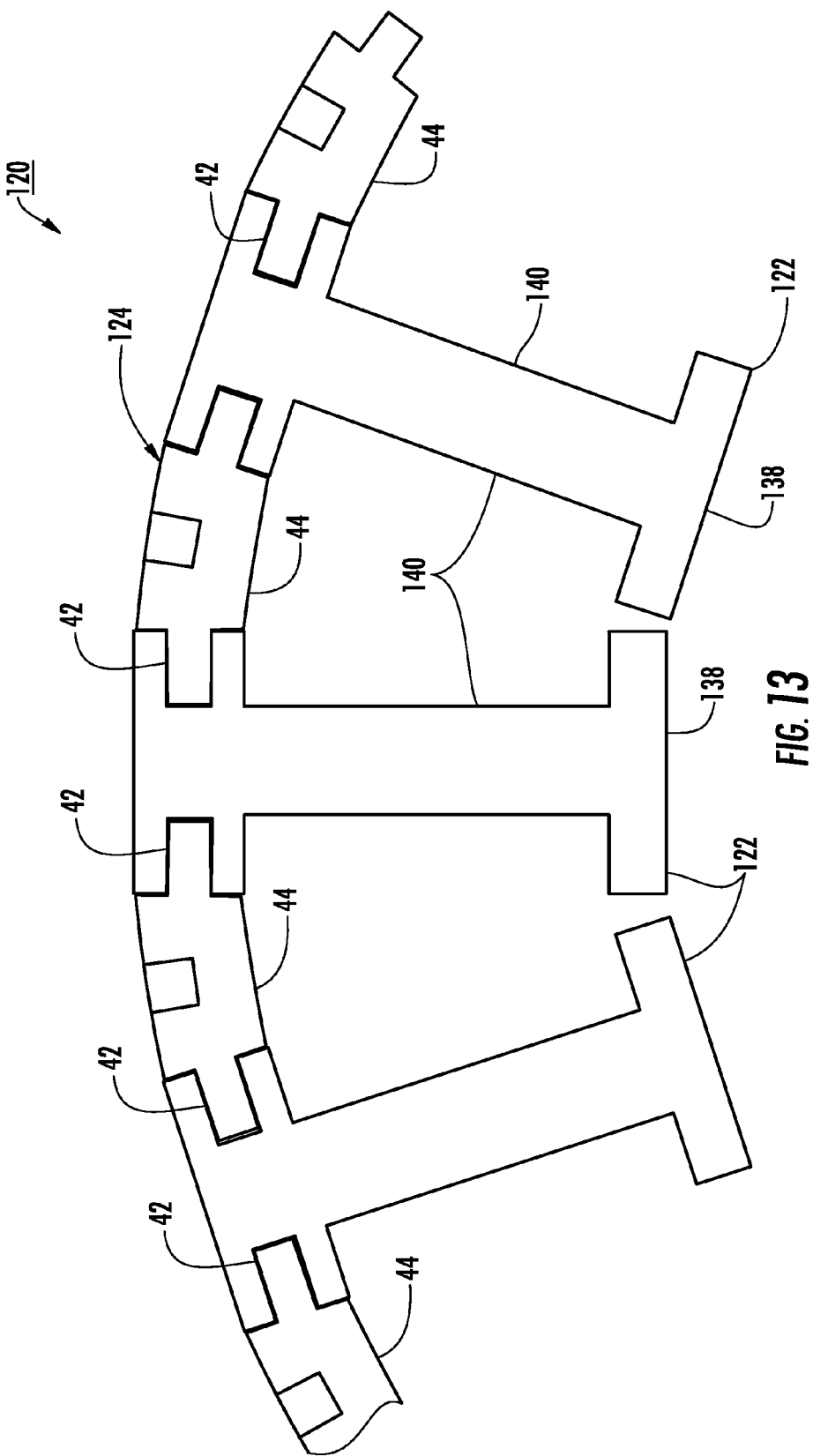
FIG. 13 is an end view of a portion of a stator, according to another embodiment of the invention, as viewed in the direction of the axis of rotation of a rotor of the motor or generator with windings removed to illustrate additional details of the teeth.
Figure 14:
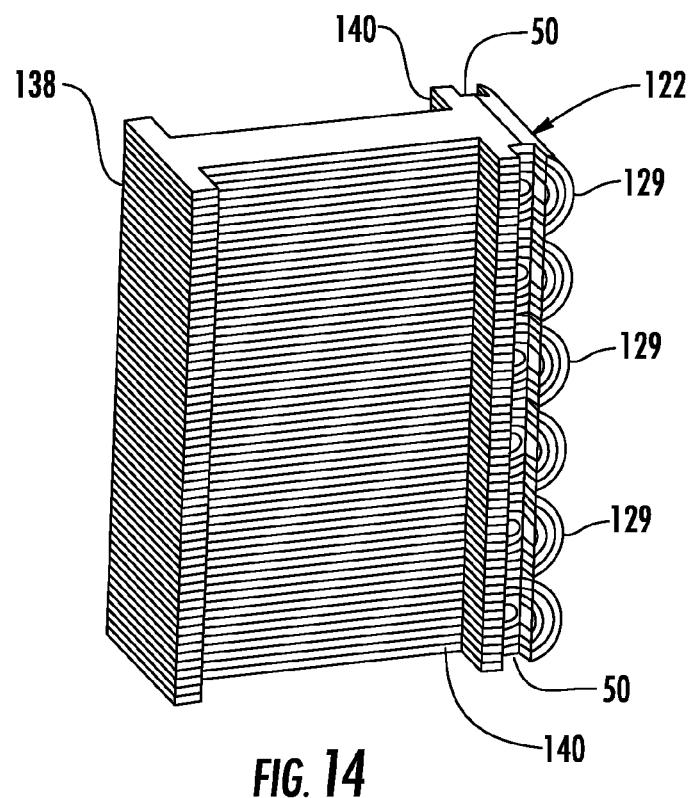
FIG. 14 is a perspective view of a tooth shown in FIG. 13.

An alternative embodiment of a stator 120 includes teeth 122, a yoke 124 joining the teeth and an electrical winding (not shown) around each tooth 122 (FIGS. 13 and 14). In the illustrated embodiment, teeth 122 are made from a stack of amorphous metal sheets 123 that are formed by folding at least one stack of amorphous metal sheets with sufficient compression to experience persistent deformation of the metal sheets to make at least one folded stack 129. Teeth 122 may be made using the same method as previously described for forming teeth 22, but without a retention pin. However, teeth 122 are retained by complementary retention shapes 42 formed in teeth 122 and yoke 124. In the illustrated embodiment, retention shapes 42 include an extension 48 from the yoke engaging a notch 50 in the tooth, or vice versa. However, other shapes may be apparent to the skilled artisan.

Yoke 124 is made from a soft magnetic material that is different from the material making up metal sheets 123. Yoke 124 may be made up of a plurality of yoke pieces 44 with each yoke piece spanning two adjacent teeth 122. Yoke pieces 44 may be joined to teeth 22 by an adhesive or some other form of bonding including interference fit, or the like. The yoke pieces are assembled to the teeth after the electrical winding is formed around each of the teeth to form the stator. Yoke pieces 44 may be made by injection molding, such as with a powdered metal-filled plastic material. However, yoke pieces 44 may be made by compression molding, extrusion, or other plastic forming technique. In the illustrated embodiment, each yoke piece has a tongue 52 and groove 54 to allow multiple yoke pieces to be stacked together in the direction of axis A and joined using known bonding techniques. However, each yoke section could be a unitary member.

Each tooth 122 may be made from a plurality of folded stacks 129 that are bonded together in the manner illustrated in FIG. 14. If both the yoke section and the teeth are made from separate respective yoke pieces and folded stacks, these components would be configured so that separation seams would not line up with each other so as to impart mechanical strength. As with teeth 22, teeth 122 may be machined post-folding in order to form a pole face 138, winding notches 140, and notch 50 (FIG. 14).

Figure 15:
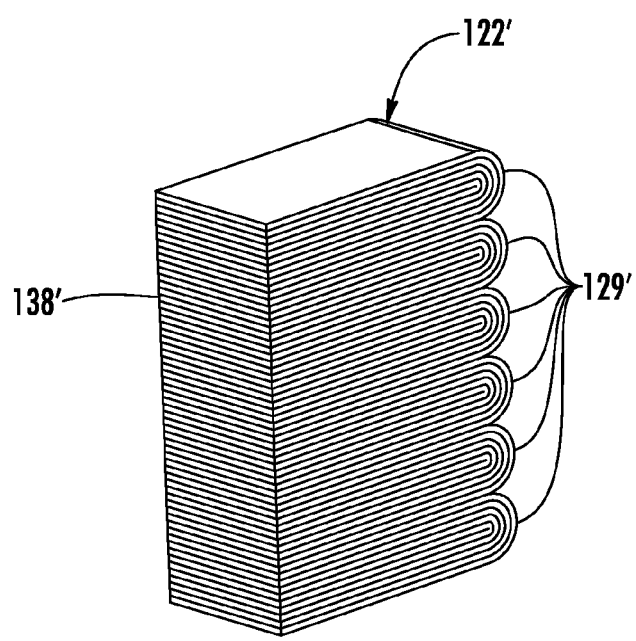
FIG. 15 is the same view as FIG. 14 of an alternative embodiment thereof.
Figure 16:
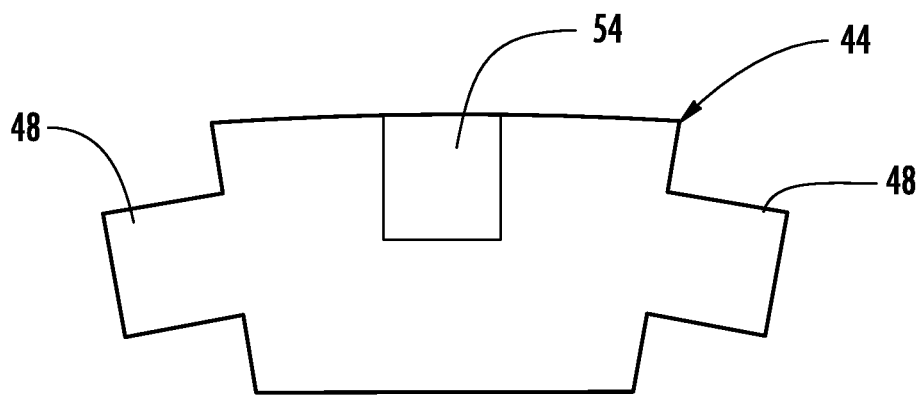
FIG. 16 is an end view of a yoke piece shown in FIG. 13.
Figure 17:
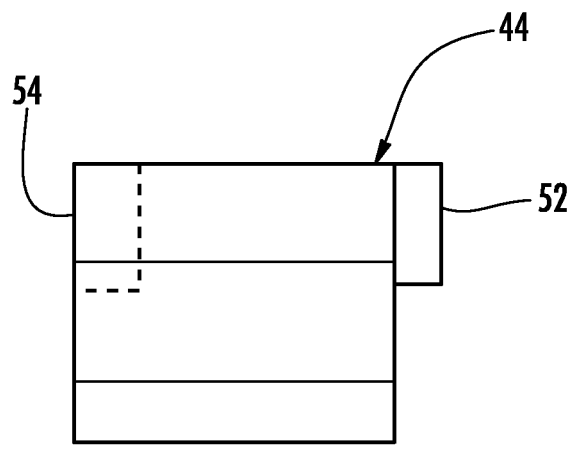
FIG. 17 is a side elevation of the yoke piece shown in FIG. 16.

Alternatively, a tooth 122' may be used that is similar to tooth 122 but does not have as much, or not necessarily any, material removed by post-folding machining (FIG. 15). Tooth 122' is made up of a plurality of folded stacks 129' that form a pole face 138'. The little or no post-folding machining of tooth 122' reduces the number of steps involved in forming the stator and uses more of the magnetic material. Tooth 122' may find application in certain motor or generator designs.

Figure 18:
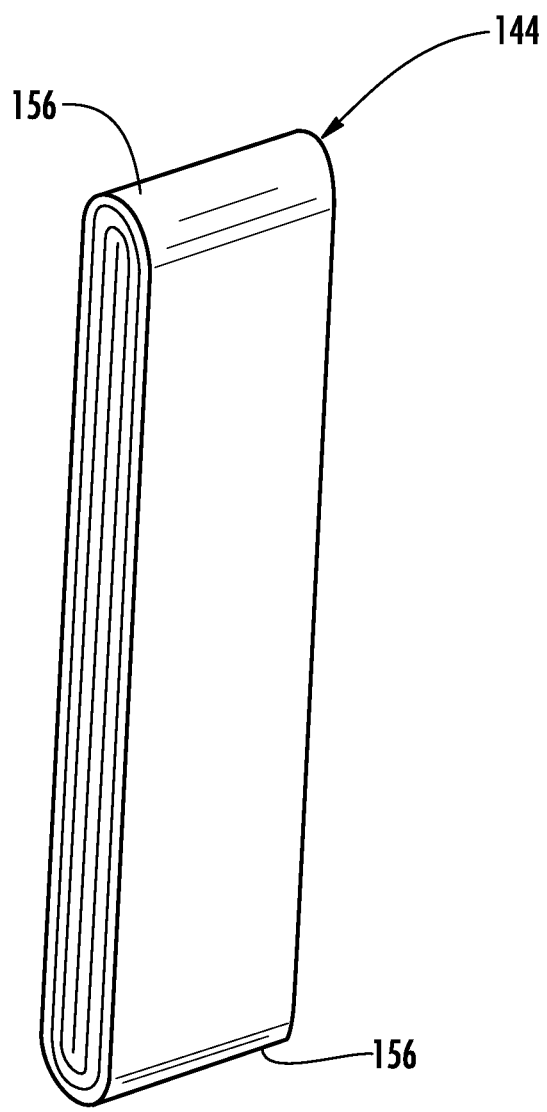
FIG. 18 is a perspective view of an alternative embodiment of a yoke piece.
Figure 19:
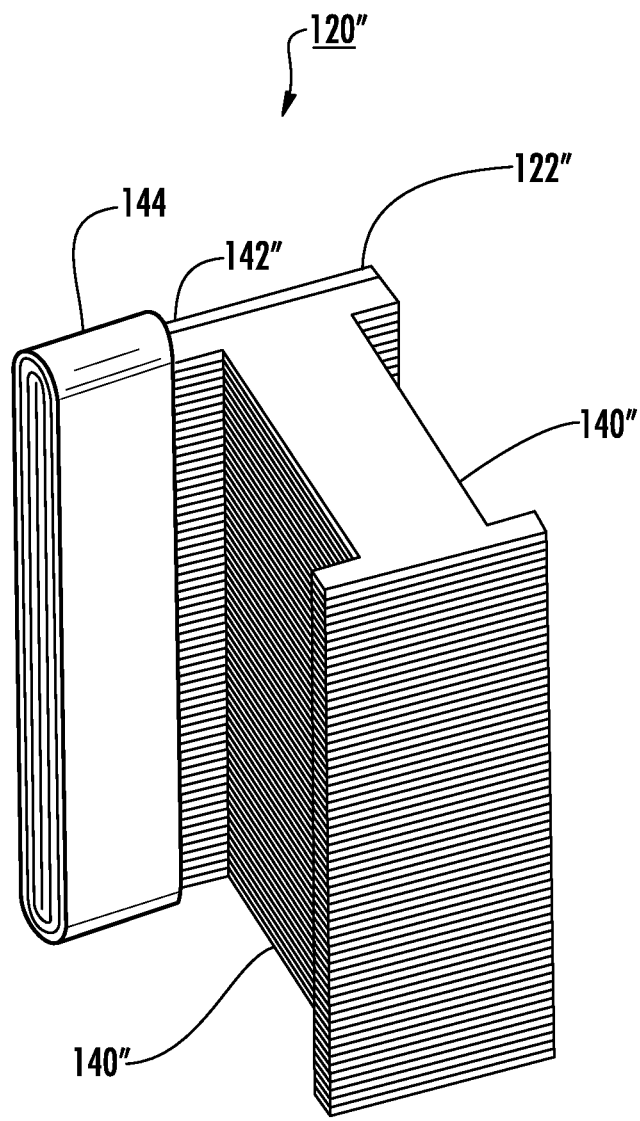
FIG. 19 is a perspective view of a portion of a stator, according to another embodiment of the invention.
Figure 20:
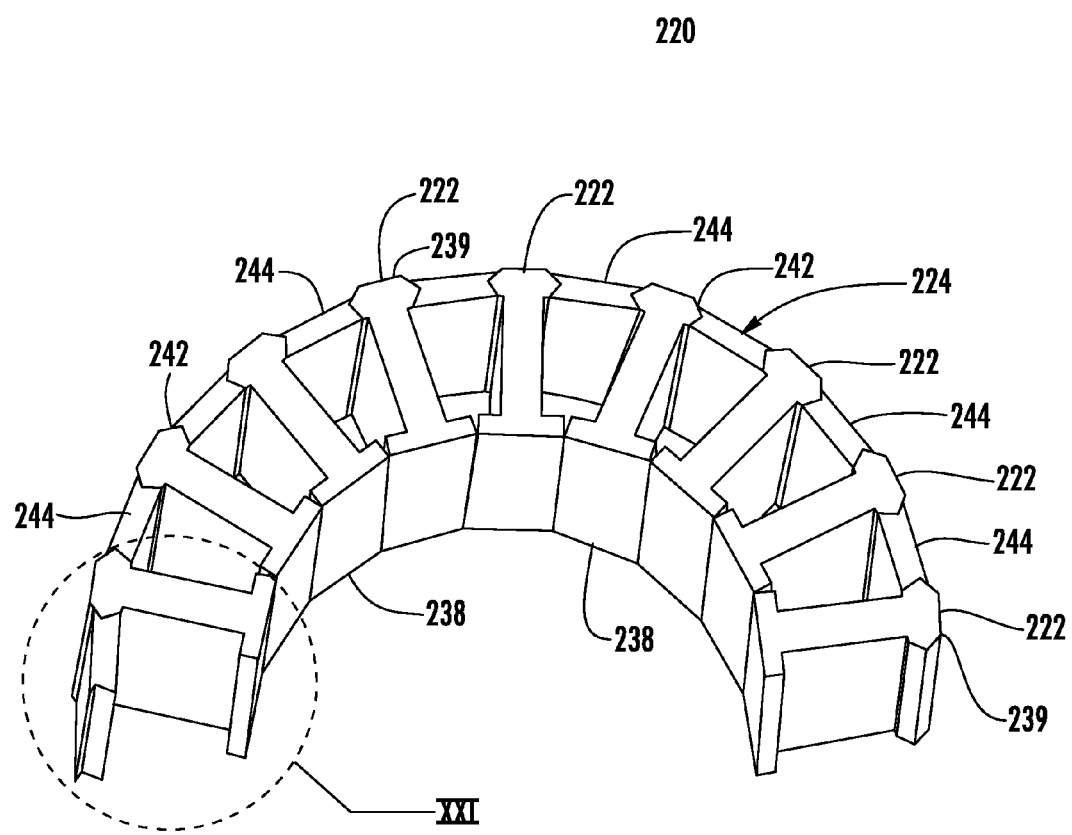
FIG. 20 is a perspective view of a portion of a stator, according to yet another embodiment of the invention.
Figure 21:
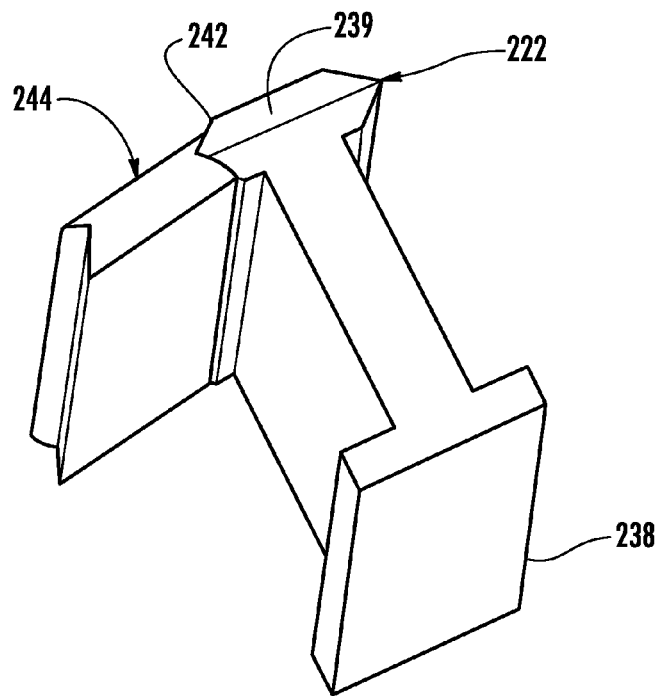
FIG. 21 is an enlarged perspective view of the area indicated by XXI in FIG. 20.
Figures 22, 23:
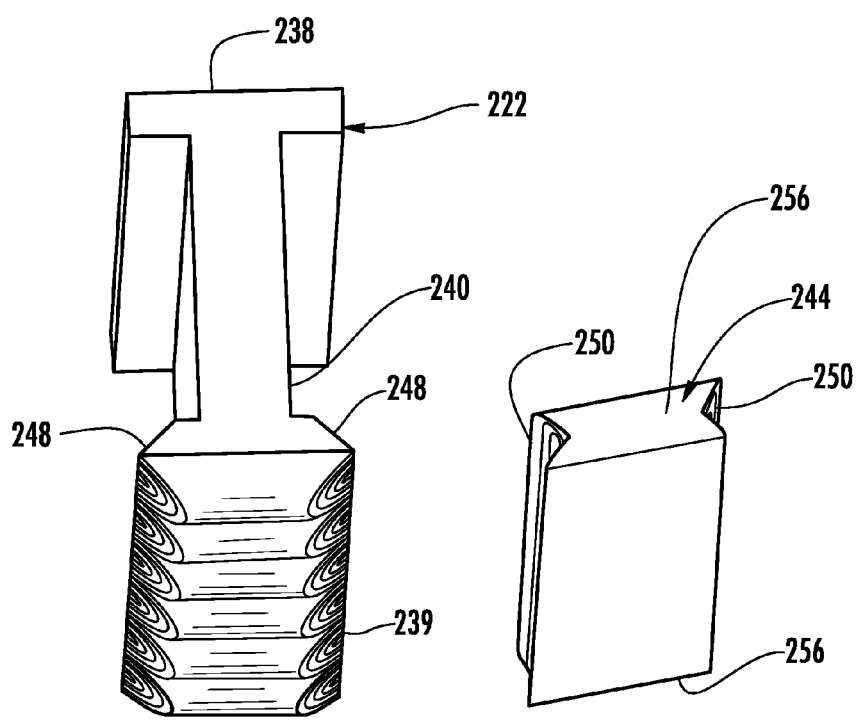
FIG. 22 is a perspective view of the tooth in FIG. 21.
FIG. 23 is a perspective view of the yoke piece in FIG. 21.

An alternative design of a yoke piece 144 is made from a folded stack of low-loss magnetic material sheets (FIG. 18). In this case, the same method as used to form flattened toroid 31 is used to produce the yoke piece with sufficient compression to impart persistent deformation of the folded stack of sheets. Yoke piece 144 can have folded radii 156 remaining on both ends and not be severed into severed portions, such as severed portions 36 used in the making of teeth 22. A stator 120" can be made from combining an equal number of yoke pieces 144 and teeth 122", only one of each being shown in FIG. 19. Tooth 122" has post folding machining performed to form winding notches 140". However, a generally planar interface is provided at retention shape 142" between each tooth 122" and the adjacent yoke piece 144. This planar interface reduces the amount of post folding machining of both the tooth and yoke piece. A conventional adhesive can be used to join the interface between teeth 122" and yoke pieces 144.

By making both the teeth 122" and yoke pieces 144 from stacks of low-loss magnetic material sheets, stator 120" provides a superior flux path because magnetic losses are reduced by maintaining overall flux and reducing power loss at the interface. As can clearly be seen in FIG. 19, the lamination plane of yoke pieces 144 does not need to align with the lamination plane of teeth 122". Indeed, not only are the lamination planes of yoke pieces 144 and teeth 122" not coplanar, they are perpendicular to each other. However, it is comprehended that the non-coplanar arrangement of the lamination planes between the teeth and yoke pieces has acceptable performance capabilities and is more cost effective to manufacture. Also, the windings (not shown) can be applied to each tooth prior to assembly to the yoke pieces.

In yet another embodiment, a stator 220 is made up of teeth 222 and yoke pieces 244 that are fitted together at a retention shape 242 made up of a matching extension, such as a wedge 248, and notch, such as a tapered slot 250 (FIGS. 20-23). Teeth 222 and yoke pieces 244 are made from folded stacks of low-loss magnetic material sheets and are oriented to each other with non-coplanar laminates in the same manner as teeth 122" and yoke pieces 144. Teeth 222 are machined post-folding in order to form winding notches 240 thereby defining a pole face 238 and an opposite distal end 239. Distal end 239 is machined to form wedges 248. Yoke pieces 244 are similar to yoke pieces 144 except that the edge portions between folded radii 256 are machined to form tapered slots 250. The skilled artisan would recognize that wedges 248 and tapered slots 250 could be reversed. Also, other retention shapes could be used. The combination of wedges 248 and tapered slots 250 provides a self-centering interface. The interface also increases air gap surface to increase overall flux and reduce power loss. This interface also allows flux to stay within the plane of the sheets of low-loss magnetic material as the flux crosses the interface between the tooth and adjacent yoke piece. It should be understood that the dimensioning of the electrical winding region, the details of the interface, and length of the tooth and yoke pieces can be configured to the particular application, namely the size and speed of the motor or generator under consideration, as would be apparent to the skilled artisan.

Figure 24:
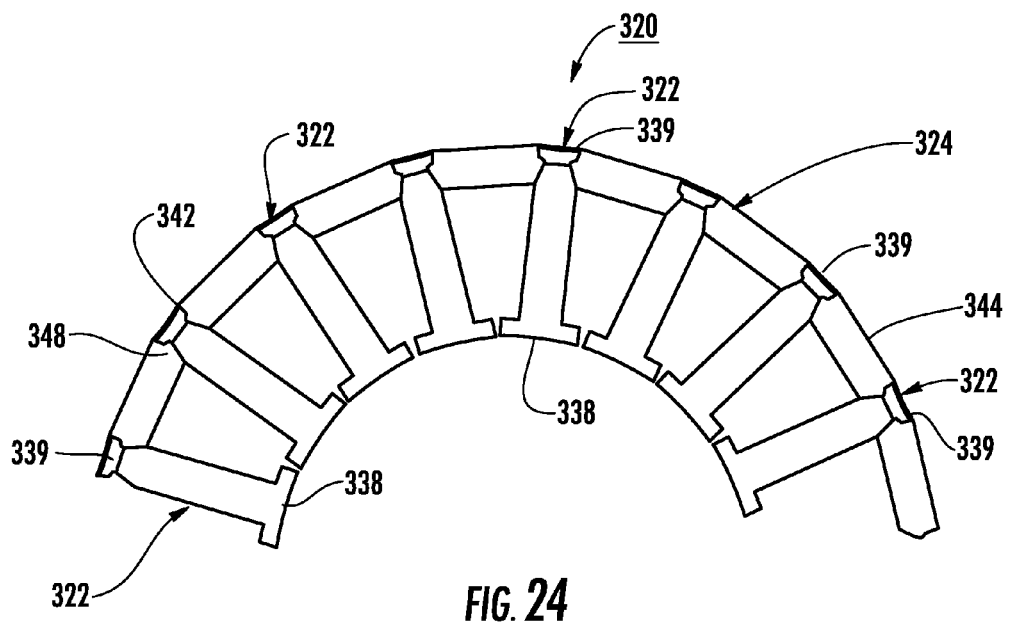
FIG. 24 is a perspective view of a portion of a stator, according to yet another embodiment of the invention.
Figure 25:
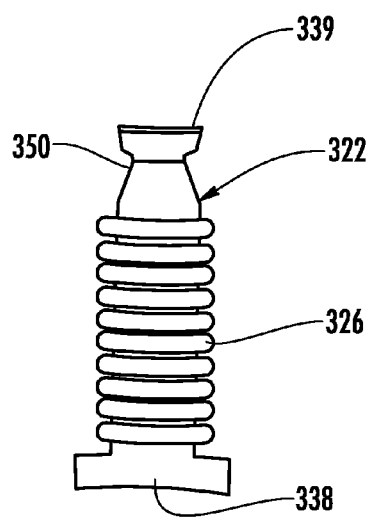
FIG. 25 is an enlarged perspective view of a tooth in FIG. 24.
Figure 26:
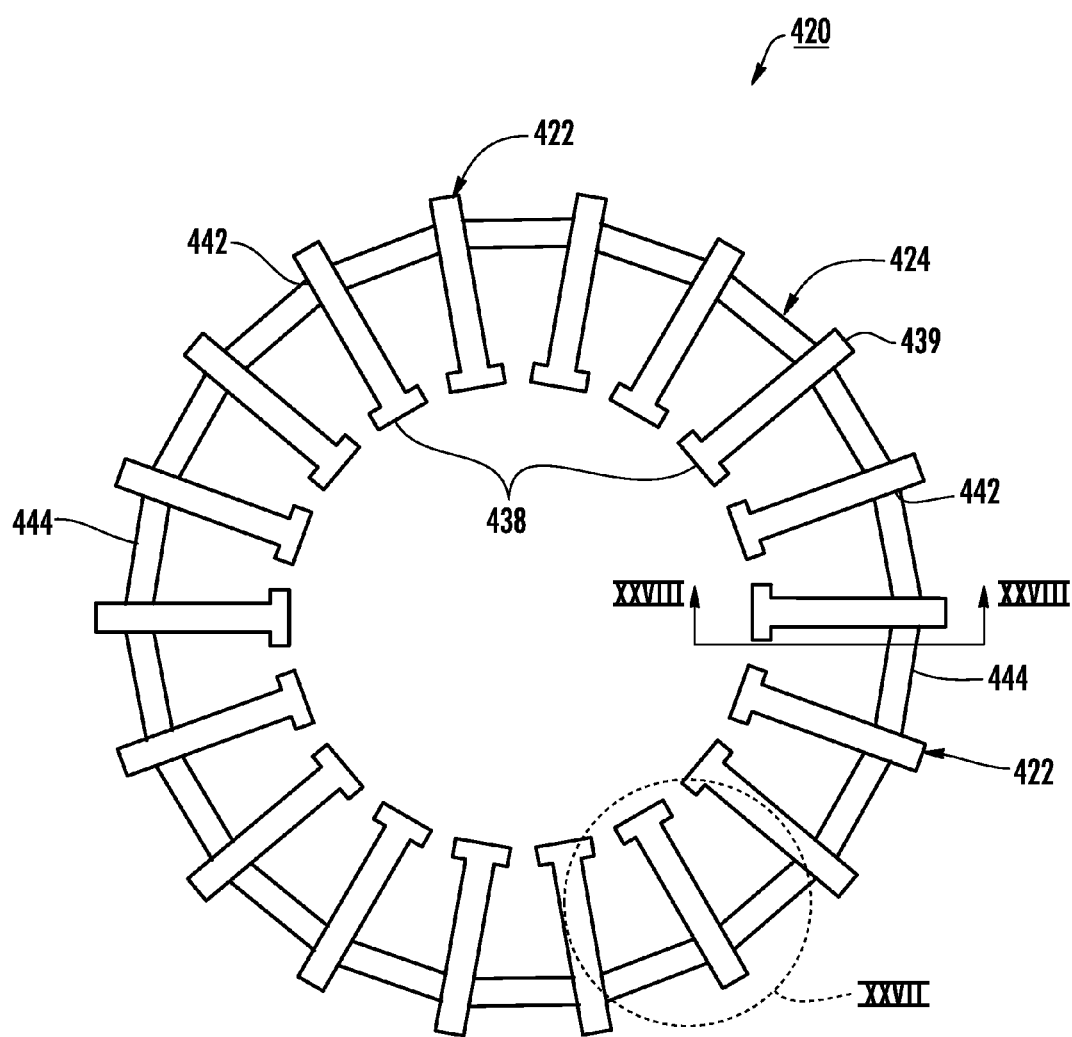
FIG. 26 is a perspective view of a stator, according to yet another embodiment of the invention.
Figure 27:
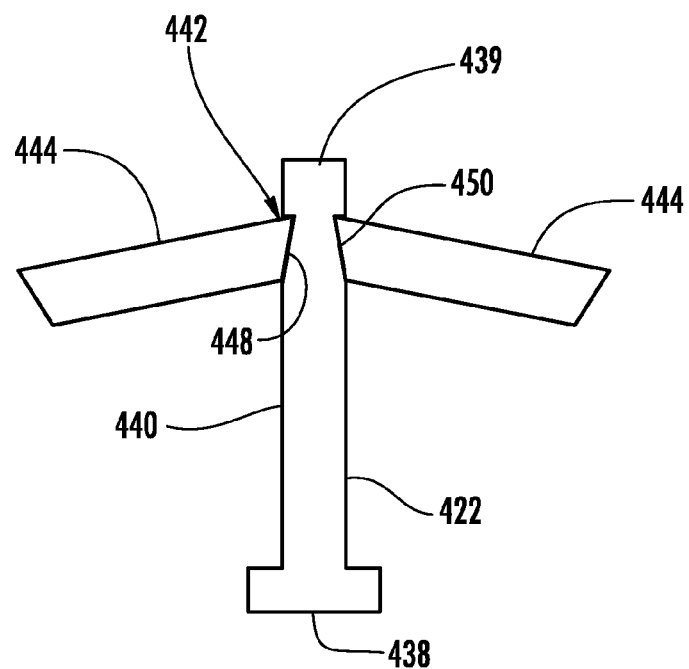
FIG. 27 is an enlargement of the area designated XXVII in FIG. 26.

In yet a further embodiment, a motor or generator stator 320 is made up of teeth 322 and a yoke 324 (FIGS. 24 and 25). Yoke 324 is made up of yoke pieces 344 that, along with teeth 322, are made from folded stacks of low-loss magnetic material sheets and are oriented to each other with non-coplanar laminates in the same manner as teeth 122" and yoke pieces 144. A retention shape 342 is formed between adjacent teeth and yoke pieces that includes an extension, such as a wedge 348, formed at the yoke piece and a notch, such as a tapered slot 350, formed at each side of tooth 322. Teeth 322 and yoke pieces 344 are configured to allow distal end 339 of each tooth 322 to be no wider than the area of the tooth upon which winding 326 is formed. This facilitates a simple slide-on technique to install the electrical winding. This further reduces the installation cost of the electrical winding by allowing the winding to be formed separate from the tooth and slid onto the tooth over distal end 339.

Figure 28:
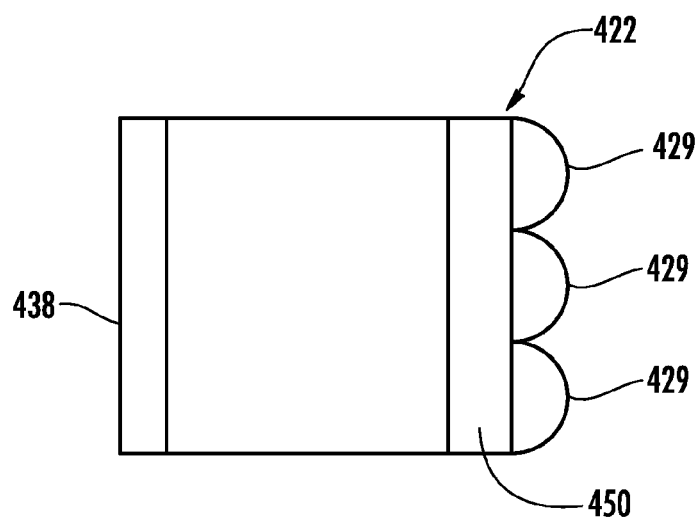
FIG. 28 is a sectional view taken along the lines XXVIII-XXVIII in FIG. 26.

In yet a further embodiment, a motor or generator stator 420 is made up of teeth 422 and a yoke 424 (FIGS. 26-36). Yoke 424 is made up of yoke pieces 444 that, along with teeth 422, are made from folded stacks of low-loss magnetic material sheets. Teeth 422 are made from a plurality of folded stacks 429 of low-loss magnetic material sheets that are joined together as seen in FIG. 28 and are oriented to each other with non-coplanar laminates in the same manner as teeth 122" and yoke pieces 144. A retention shape 442 is formed between adjacent teeth and yoke pieces that includes an extension, such as an angled surface 448, formed at the yoke piece and a notch, such as a tapered slot 450, formed at each side of tooth 422. Teeth 422 and yoke pieces 444 are configured to allow distal end 439 of each tooth 422 to be no wider than the area of the tooth upon which winding 326 is formed. This facilitates a simple slide-on technique to install the electrical winding. This further reduces the installation cost of the electrical winding and electrical efficiency of the motor/generator by allowing the winding to be formed separate from the tooth and slid onto the tooth over distal end 439.

Figure 31:
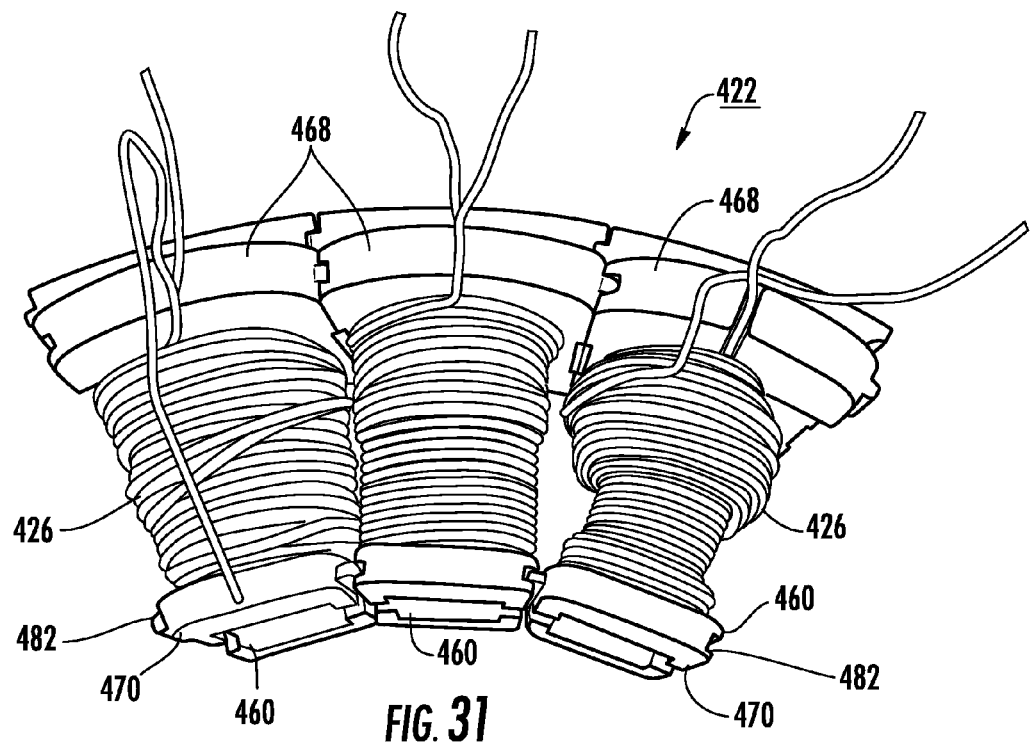
FIG. 31 is a perspective view of a portion of a stator comprising a plurality of the coil assemblies in FIG. 29.

Stator 422 is made up of a series of coil assemblies 460, each made up of a bobbin 462 in which one tooth 422 is inserted and a wire coil 480 wound around the bobbin. Bobbin 462 defines an internal space 474 for receiving one of teeth 422 and an adjoining space 476 for joining that tooth to adjacent yoke pieces 444. Each bobbin 462 includes a top section 468 and bottom section 470 that are joined with the respective top and bottom sections of the bobbin of the adjacent coil, as best seen in FIG. 31. To assist in this joining, complementary shapes 482 are defined in opposite sides of top section 468 and bottom section 470 for joining adjacent bobbins, such as by an adhesive, or the like. This not only provides structural integrity to stator 422, but also serves to maintain teeth 422 and yoke pieces 444 in juxtaposition and serves to maintain proper position of pole face 438 of each tooth.

Figure 29:
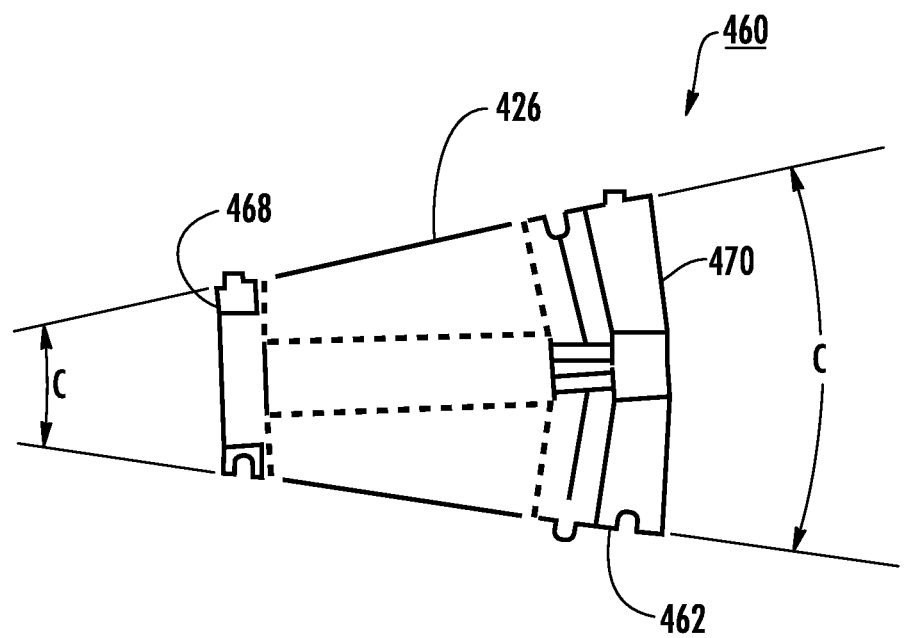
FIG. 29 is a plan view of a coil assembly.
Figure 30:
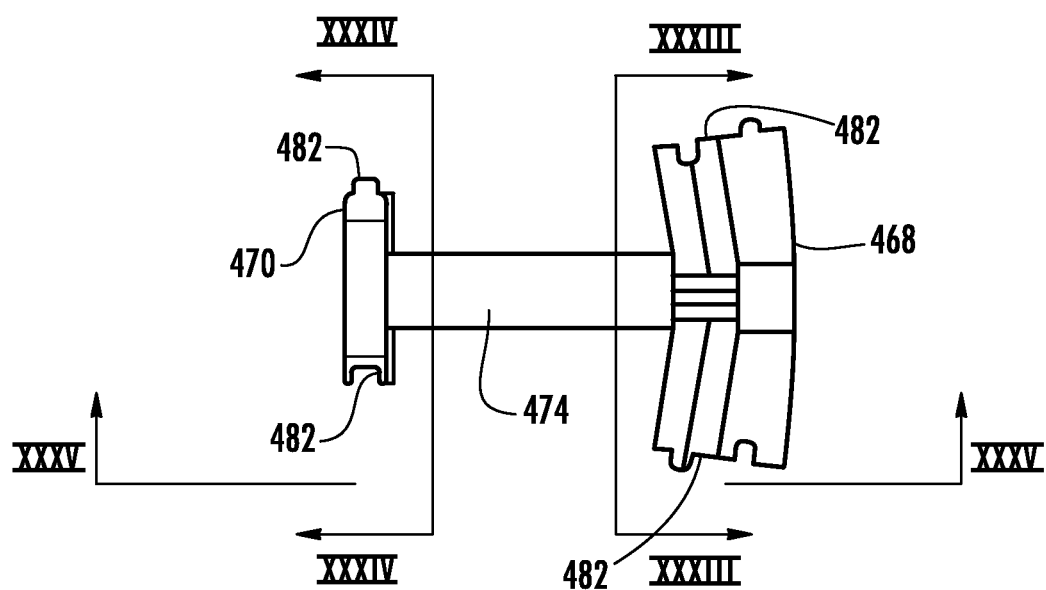
FIG. 30 is the same view as FIG. 29 of a bobbin used in the coil assembly.

As can best be seen in FIG. 29, top section 470 is wider than bottom section 470, thereby defining a cone shape C. Winding 426 can be formed to the outer limit of cone C without interfering with the winding of the adjacent coil assembly. In this manner, a neat densely packed winding can be formed around each tooth that can extend up against the winding of the adjacent tooth in order to enhance the electrical efficiency of the respective motor or generator.

Figure 32:
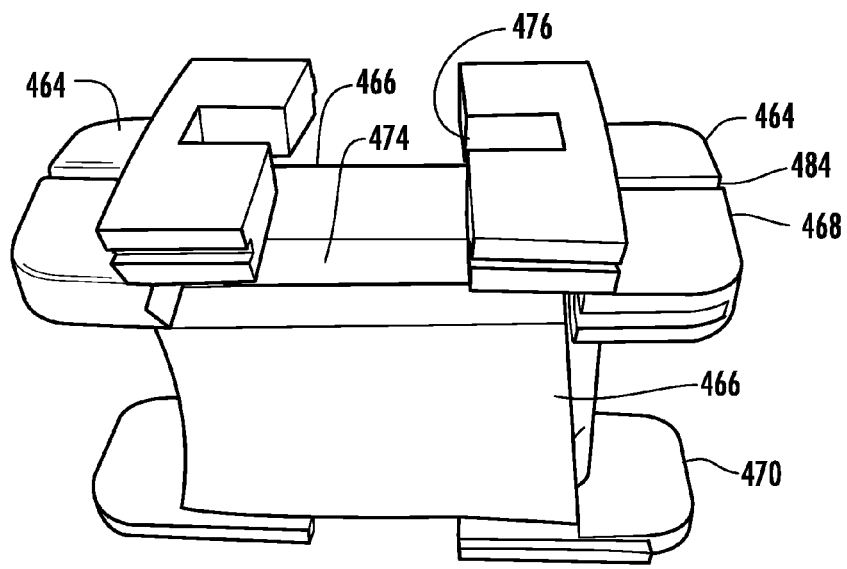
FIG. 32 is a perspective view of the bobbin in FIG. 30.
Figure 33:
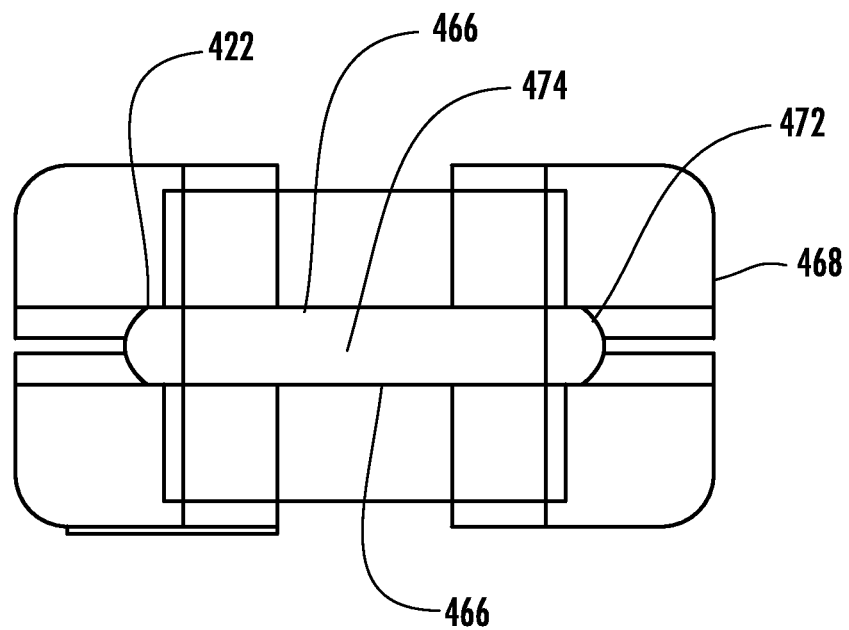
FIG. 33 is a sectional view taken along the lines XXXIII-XXXIII in FIG. 30.
Figure 34:
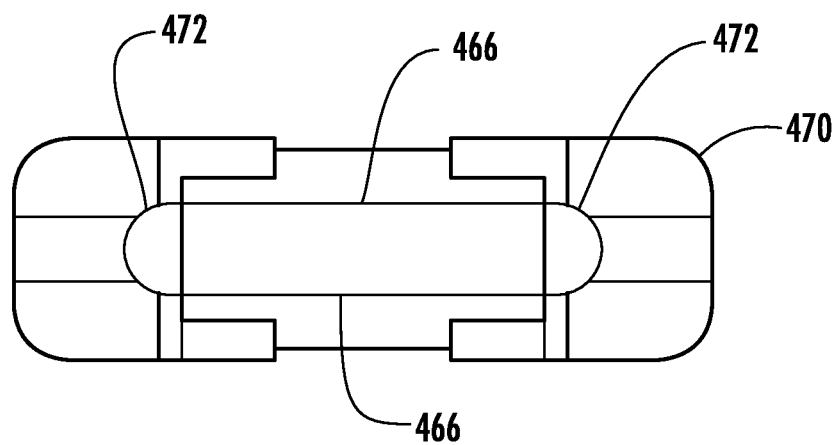
FIG. 34 is a sectional view taken along the lines XXXIV-XXXIV in FIG. 30.
Figure 36:
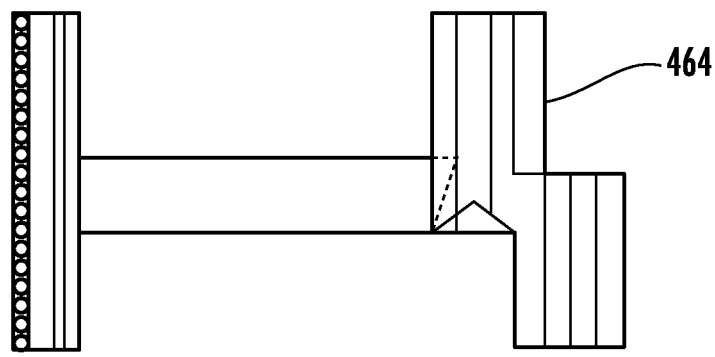
FIG. 36 is the same view as FIG. 35 of a bobbin half.
Figure 35:
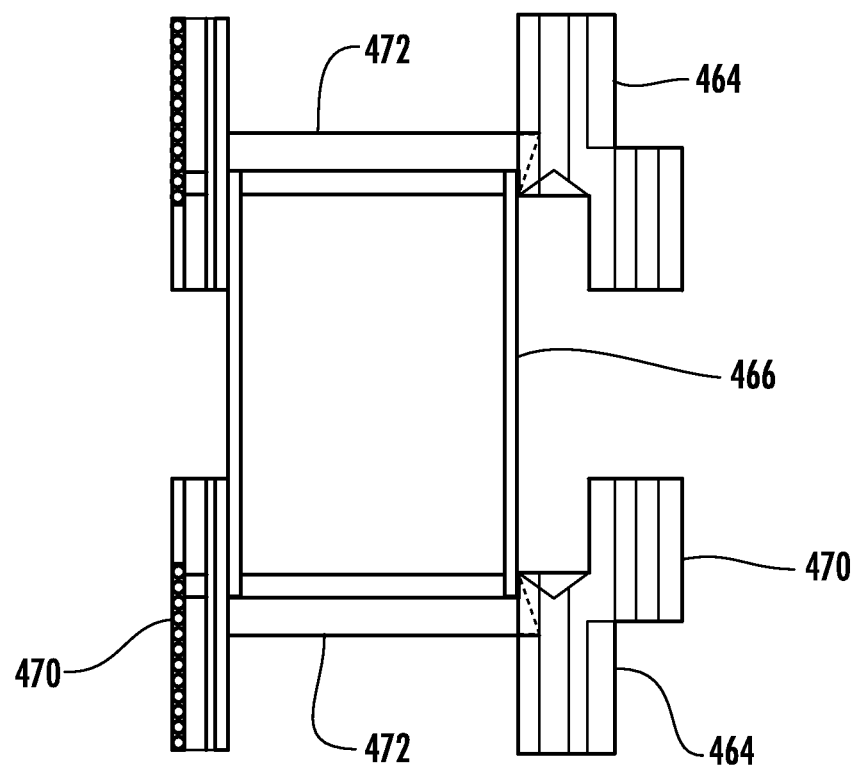
FIG. 35 is a view from the direction XXXV-XXXV in FIG. 30.
Figure 38:
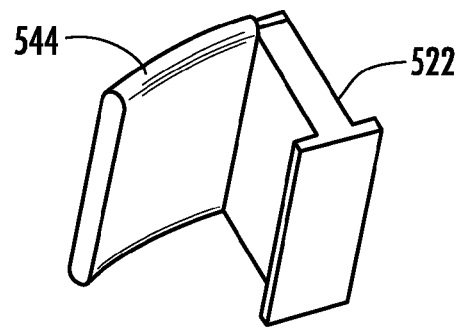
FIG. 38 is a more detailed view of the area designated XXXVIII in FIG. 37.
Figure 37:
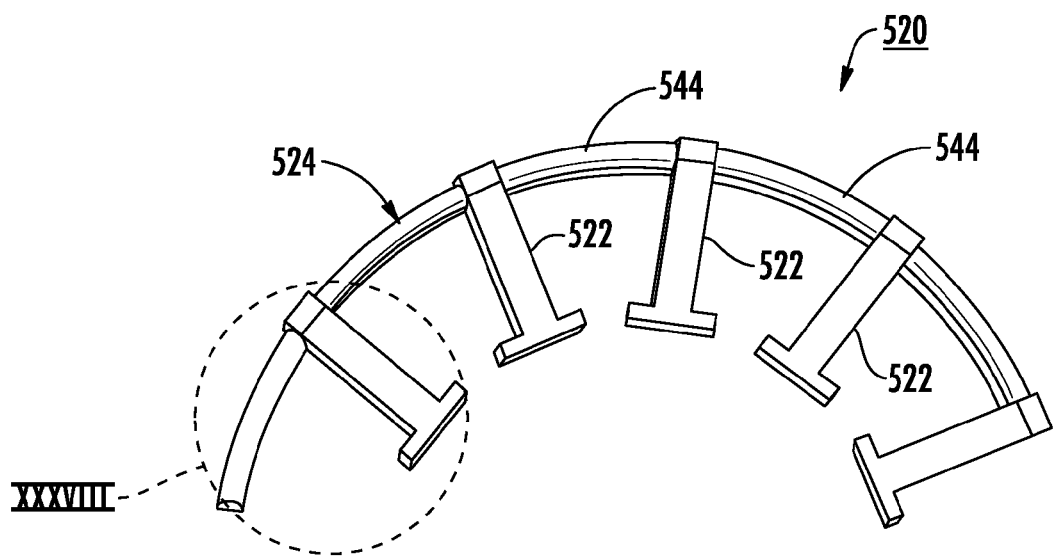
FIG. 37 is a perspective view of a stator, according to yet another embodiment of the invention.

Each bobbin 462 is defined by bobbin halves 464 and insulating paper, such as Mylar sheet 466 of the type known in the art, joining bobbin halves 464, as best seen in FIG. 32. Each bobbin half 464 includes a top section 468a and bottom section 470a that are joined by a post 472. Insulating paper sheets 466 space-apart posts 472 and posts 472 space-apart insulating paper sheets 466 thereby defining tooth receiving space 474. Although, insulating paper 466 is not particularly rigid, winding 426 can be formed over the bobbin with a spacer in space 474 to maintain the dimension of tooth receiving space 474. After the winding is formed, the insertion of tooth 422 into tooth receiving space 474 will maintain the components of bobbin 262 in proper alignment. Moreover, use of insulating paper 466 sheets to join bobbin halves 464 together has the advantage of minimizing spacing between winding 426 and tooth 422 thereby yet further increasing electrical efficiency of the resulting motor or generator. In the illustrated embodiment, bobbin halves 464 are identical in shape, but rotated to be facing one another. They are formed in a manner to also define yoke interface space 478 at the proper location with respect to the teeth. Also, slits 484 can be formed at top section 468 in order to secure ends of the insulated wire forming winding 426 as best illustrated in FIG. 31.

In yet another embodiment, a stator 520 is made up of a plurality of teeth 522, that is constructed in the manner previously described, and a yoke 524 is composed of yoke pieces 544 joining adjacent teeth in the manner previously described. However, yoke pieces 544 are non-planar, such as chord or arcuate in shape, whereby yoke 524 is circular in shape. An advantage of having non-linear-shaped yoke pieces is that more of the motor will be in the form of useful volume that can be filled with torque-producing material, such as coil windings.

Figure 39:
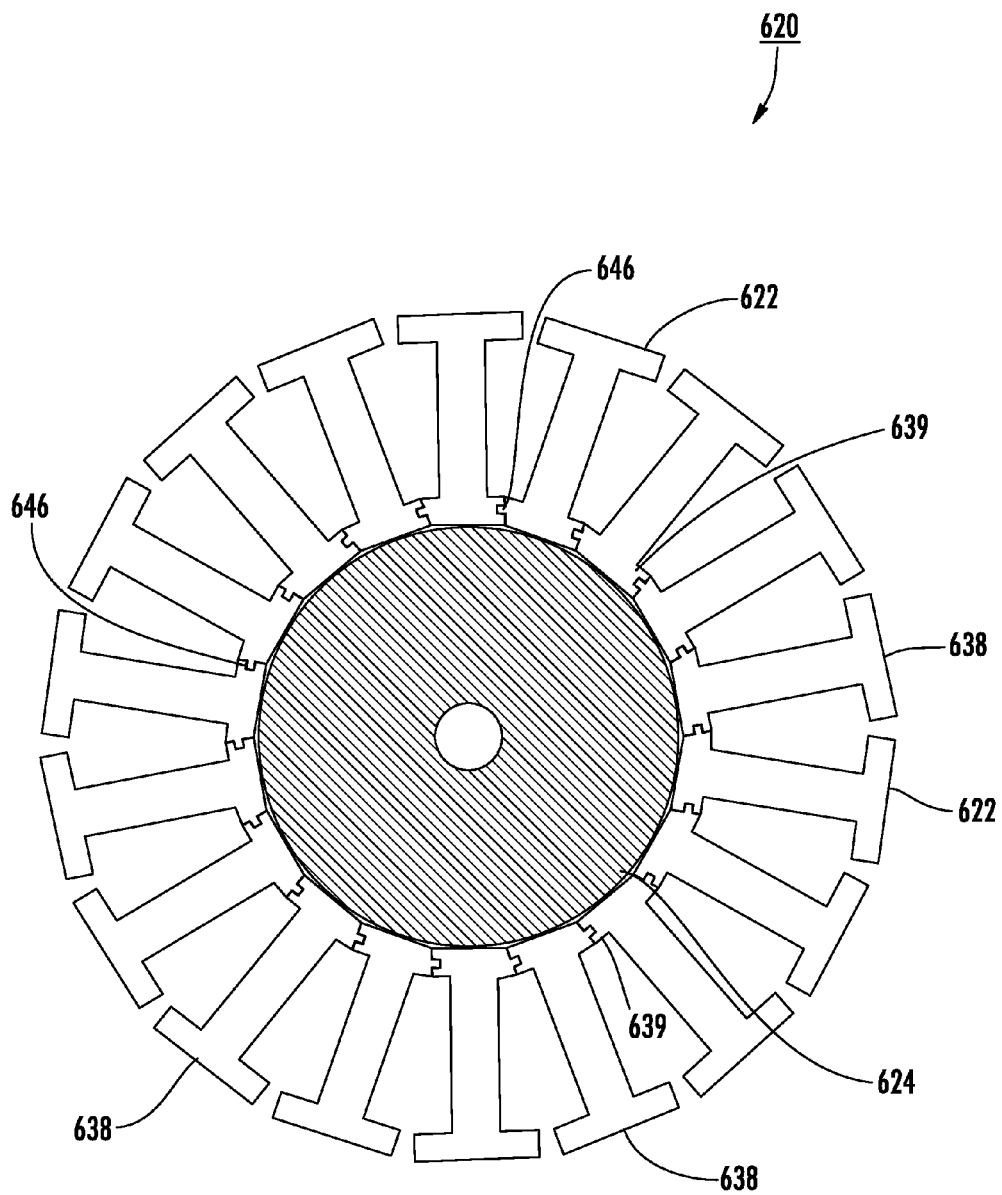
FIG. 39 is a perspective view of a stator, according to yet another embodiment of the invention.

In yet a further embodiment, a motor or generator stator 620 is made up of teeth 622 and a yoke 624 (FIG. 39). Stator 620 is an example of a stationary stator that is used with an outwardly positioned rotor (not shown) that rotates around stator 620 in response to the magnetic field created by stator 620. Such outwardly positioned rotor may be in the form of a steel shell with permanent magnets attached at an inner surface thereof and may be used for motorized conveyor and belt drive rollers, and the like, as is known in the art. While teeth 622 are made up of folded stacks of low-loss magnetic material sheets, yoke 624 may be made from an injection-molded soft magnetic material, as previously described, or more conventional laminated stacks of soft magnetic material. Alternatively, yoke 624 may be made of a non-magnetic material and be used only for providing mechanical strength to the stator. The inner ends 639 of teeth 622 are magnetically coupled with each other, such as by complementary shapes 646. The distal ends of teeth 622 form pole faces 638. Winds (not shown) are formed around each tooth 622 such as around a bobbin similar to that previously described. Other examples will be apparent to the skilled artisan having been apprised of the various embodiments depicted herein.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A stator for an electrical motor or generator having an axis of rotation, said stator comprising:
   a plurality of teeth each of said teeth is made from a plurality of folded stacks of low-loss magnetic material sheets;
   a yoke joining said teeth wherein said yoke comprises a plurality of yoke pieces, each comprising at least one stack of low-loss magnetic material sheets wherein each of said yoke pieces spans adjacent ones of said teeth; and
   a plurality of electrically conductive windings, each around one of said teeth;
   wherein each said teeth and said yoke pieces comprise at least one folded stack of magnetic material sheets, wherein the folded stack of magnetic material sheets is flattened;
   wherein each of said magnetic material sheets of said teeth is on a lamination plane that is oriented perpendicular to the motor or generator axis of rotation and wherein at least a portion of each of said magnetic material sheets of said yoke pieces is on a lamination plane that is perpendicular to the lamination plane of said magnetic material sheets of said teeth at interfaces between said yoke pieces and said teeth.

2. The stator as claimed in claim 1 wherein said teeth and said yoke pieces are retained together by complementary shapes formed in said teeth and said yoke pieces.

3. The stator as claimed in claim 1 wherein said magnetic material sheets comprise a silicon content of at least approximately 6.0%.

4. The stator as claimed in claim 1 wherein said magnetic material sheets comprise at least one chosen from an amorphous metal, a nanocrystalline metal, and an optimized Si—Fe alloy.

5. The stator as claimed in claim 1 wherein said magnetic material sheets have a thickness that is less than or equal to approximately 100 micrometers.

6. The stator as claimed in claim 5 wherein said magnetic material sheets have a thickness in a range of approximately 20 to approximately 50 micrometers.

7. The stator as claimed in claim 1 wherein said magnetic material sheets are non-insulated from each other.

8. The stator as claimed in claim 1 wherein said magnetic material sheets are held together without substantial adhesive.

9. The stator as claimed in claim 1 wherein said folded stack of low-loss magnetic material sheets defines a bight in said magnetic material sheets.

10. The stator as claimed in claim 9 including at least one chosen from a retention device at said bight and a retention shape formed at said bight.

11. The stator as claimed in claim 9 including an air gap pole face formed in each of said teeth opposite said bight and a wire winding notch between said pole face and said bight, wherein said pole face extends laterally outwardly from said wire winding notch.

12. The stator as claimed in claim 1 wherein said yoke is joined to said teeth after one of said windings is formed around each of said teeth.

13. The stator as claimed in claim 1 including a bobbin around each of said teeth, wherein each of said windings being around said bobbin of one of said teeth;
   wherein each said bobbin defines an internal space for receiving one of said teeth and for joining that tooth to adjacent yoke pieces and wherein adjacent ones of said bobbins are joined at least at said pole faces of said teeth to provide structural integrity to said stator and to maintain proper position of said pole faces of said teeth.

14. The stator as claimed in claim 13 wherein each said bobbin includes complementary shapes for joining to adjacent ones of said bobbin.

15. The stator as claimed in claim 13 wherein each said bobbin is defined by bobbin halves and insulating paper joining said bobbin halves.

16. The stator as claimed in claim 15 wherein said bobbin halves are identical in shape.

17. The stator as claimed in claim 1 in combination with a rotor thereby defining an electrical motor or an electrical generator.

18. A method of making a stator for an electrical motor or generator having an axis of rotation, said method comprising:

forming a plurality of teeth including forming each of said teeth from a plurality of folded stacks of low-loss magnetic material sheets;

forming a yoke and joining said teeth to said yoke including forming said yoke from a plurality of yoke pieces, each comprising at least one stack of low-loss magnetic material sheets wherein each of said yoke pieces spans adjacent ones of said teeth; and juxtaposing a plurality of electrically conductive windings, each around one of said teeth;

including forming each said teeth and said yoke by folding at least one stack of magnetic material sheets to form a folded stack of magnetic material sheets and including flattening the folded stack of magnetic material sheets and further including machining the plurality of folded stacks of magnetic material sheets of said teeth after said flattening thereby enhancing a shape of the plurality of folded stacks of magnetic material sheets of said teeth to provide at least one chosen from a pole face, a retention shape, and a winding notch;

including orienting each of said magnetic material sheets of said teeth on a lamination plane that is perpendicular to the motor or generator axis of rotation and including orienting at least a portion of each of said magnetic material sheets of said yoke on a lamination plane that is perpendicular to the lamination plane of said magnetic material sheets of said teeth at interfaces between said yoke pieces and said teeth.

19. The method as claimed in claim 18 wherein said plurality of teeth defining pole faces wherein said winding a plurality of electrically conductive windings comprises each of said windings being around one of a plurality of bobbins and inserting one of said teeth in each of said bobbins; and wherein each said bobbin defines an internal space for receiving one of said teeth and for joining that tooth to adjacent yoke pieces and including joining adjacent ones of said bobbins at least at said pole faces of said teeth to provide structural integrity to said stator and to maintain proper position of said pole faces of said teeth.

* * * * *